United States Patent [19]

Satou

[11] Patent Number: 5,130,892
[45] Date of Patent: Jul. 14, 1992

[54] PORTABLE ELECTRONIC DEVICE WITH BATTERY PACK RETAINED BY A SPRING-LOADED SLIDER UNIT

[75] Inventor: Youji Satou, Tokyo, Japan
[73] Assignee: Kabushiki Kaisha Toshiba, Kawasaki, Japan
[21] Appl. No.: 577,758
[22] Filed: Sep. 5, 1990

[30] Foreign Application Priority Data

Oct. 31, 1989 [JP] Japan ............... 1-283722

[51] Int. Cl.⁵ .............. H05K 7/10; H01M 2/10; H01R 13/627; E05C 1/10
[52] U.S. Cl. ............................ 361/392; 429/97; 439/352; 292/175; 361/391
[58] Field of Search ......... 429/96, 97, 98, 99, 429/100; 364/708; 439/352; 361/380, 392, 393, 394, 395, 399, 390, 391; D14/100, 101, 106, 114, 115; 292/163, 175, DIG. 38; 307/150

[56] References Cited

U.S. PATENT DOCUMENTS

| | | | |
|---|---|---|---|
| 3,709,538 | 1/1973 | Seitz et al. ............... | 292/DIG. 38 X |
| 3,907,346 | 9/1975 | Van Klompenburg .... | 292/DIG. 38 X |
| 4,113,292 | 9/1978 | Gauron et al. ........... | 292/165 |
| 4,392,503 | 7/1983 | Watanabe ................ | 292/DIG. 38 X |
| 4,527,821 | 7/1985 | Tanaka ................... | 292/DIG. 38 X |
| 4,676,081 | 6/1987 | Craig ..................... | 292/DIG. 38 X |
| 4,683,736 | 8/1987 | Weinerman et al. ...... | 292/165 X |
| 4,790,579 | 12/1988 | Maxwell et al. ........ | 292/DIG. 38 X |

FOREIGN PATENT DOCUMENTS

2108952  3/1979  Fed. Rep. of Germany .
64-54369 9/1987  Japan .

OTHER PUBLICATIONS

Toshiba's User's Manual for the T1600 Portable Personal Computer, ©1988, pp. i, 2-1 to 2-7, 4-21 to 4-25.

Primary Examiner—Leo P. Picard
Assistant Examiner—Michael W. Phillips
Attorney, Agent, or Firm—Finnegan, Henderson, Farabow, Garrett and Dunner

[57] ABSTRACT

A passageway is formed by a wall of a recess receiving a part unit and a wall of a case close to and facing the wall of the recess. A first opening is formed on the wall of the recess communicating with the space of the recess, and a second opening is formed on the wall of the case communicating with the external atmosphere. A slider for detachably holding the part unit by a hook is inserted from the first opening into the passageway. A knob larger than the second opening is externally applied to the wall of the case to cover the second opening. The knob and the slider are detachably coupled with each other through the second opening by the hook and a portion detachably engaging with the hook.

6 Claims, 12 Drawing Sheets

PORTABLE ELECTRONIC DEVICE WITH BATTERY PACK RETAINED BY A SPRING-LOADED SLIDER UNIT

BACKGROUND OF THE INVENTION

1. Field of the Invention

The present invention relates to a portable electronic device such as a portable type personal computer or word processor, and more particularly to an electronic device where an optional part unit can be removed by a sliding movement, and also to an assembling method of an operating device for performing the removal operation.

2. Description of the Related Art

Some lap top type personal computers have such a structure that a battery pack (a optional part unit) may be detachably inserted into the upper part of the box-shaped case, as shown, for instance, by a user's manual of TOSHIBA's T1600 Portable Personal Computer and Unexamined Japanese Patent Application No.64-54369.

Some such lap top personal computers employ a structure that the battery pack having been incorporated into the case, is locked or unlocked by the operation of a slide.

Generally, such a structure comprises a recess provided at the area of the upper surface of the case that is near the edge where two walls intersect w th each other, a passageway formed in the widthwise direction of the case by the wall of the recess, and a wall of the case facing the wall of the recess. The passageway has a first opening at its one wall communicating with the space of the recess, and a second opening communicating with the exterior of the case. The recess receives the battery pack, a knob unit is incorporated into the passageway.

The knob unit has a slider slidably inserted into the passageway, a first coupling portion formed on the slider, and a knob projecting out of the slider and fitted into the second opening. The first coupling portion of the knob unit exposed through the first opening to the space in the recess. The knob is slidably inserted into the second opening.

The battery pack has a second coupling portion at a position corresponding to the position of the first coupling portion. The first and second coupling portions are brought into engagement with each other by a sliding movement of the slider and thereby lock the battery pack in the recess. When the engagement of the coupling portions is released by the sliding movement of the slider, the lock of the battery pack is released.

To incorporate the knob unit into the passageway, both the slider and the knob are inserted from the space of the recess through the first opening into the passageway, and then the knob is fitted into the second opening, while the slider is inserted into the passageway.

Since the knob unit has such a structure that its knob projects out of the slider, the knob tends to hit various portions of the passageway when the slider is inserted into the passageway. Therefore, it is troublesome to incorporate the knob unit into the case.

In addition, since the knob can be removed with respect to the second opening, the knob unit having been incorporated tends to get out of the second opening. Therefore, a structure which prevents the knob unit from getting out of the second opening must be provided.

SUMMARY OF THE INVENTION

The object of the present invention is to provide a portable electronic device in which a knob unit can be smoothly inserted into a passageway and needs no structure for preventing the knob unit once inserted into the passageway, from getting out of it through a second opening.

The present invention which is developed to accomplish the above object comprises:

a case having an edge, a first wall intersecting the edge, and a recess close to the edge and having a second wall facing the first wall;

a passageway determined in the case by the first wall and the second wall;

a first opening formed on the second wall and being in communication with an exterior;

a second opening formed on the first wall and being in communication with an exterior;

a slider inserted from the first opening into the passageway and slidable therein;

a knob larger than the second opening and provided at the first wall of the case to externally cover the second opening;

a coupling means detachably coupling through the second opening the knob and the slider;

a part unit inserted into the recess; and a locking means locking the part unit having been inserted into the recess by the slider.

When inserting the knob unit of the present invention into the passageway, the slider is inserted from the space of the recess through the first opening to the passageway. The knob is arranged on the outer surface of the case to externally cove the second opening. The knob and the slider are brought into engagement with each other through the second opening. The knob and the slider are coupled with each other and the incorporating operation is finished.

In this portable electronic device, the slider can be smoothly inserted from the space of the recess through the first opening into the passageway since the slider does not have the knob. In addition, once the knob is coupled or attached, it functions as an element for preventing the slider from getting out of the passageway, since the knob is larger than the second opening.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 11(A)–(11(C) are exploded diagrammatic views depicting operation of the slides and hooks shown in FIG. 5;

DETAILED DESCRIPTION OF THE PREFERRED EMBODIMENT

Now, one embodiment of the present invention will be explained below with reference to FIG. 1 through FIG. 9.

Figure 1:
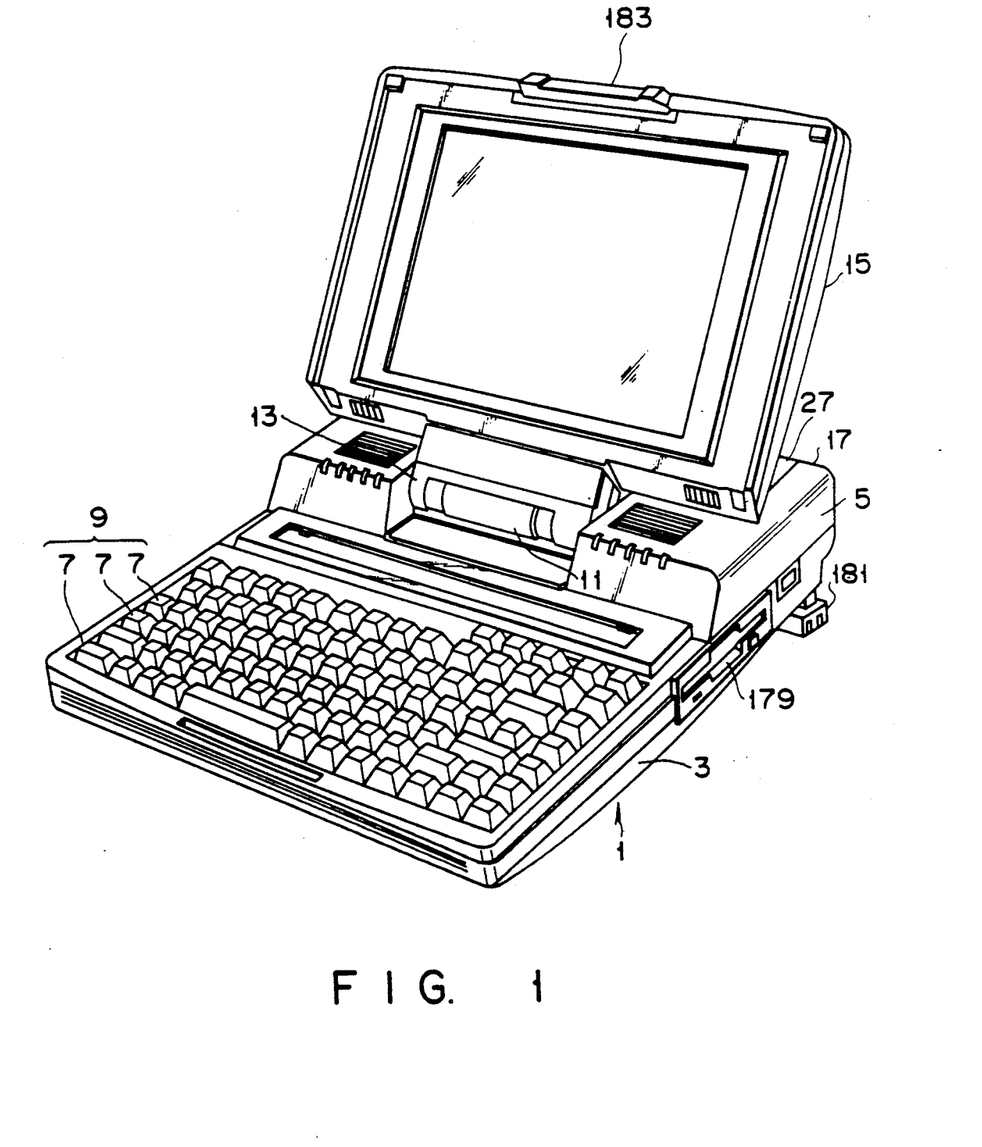
FIG. 1 is a perspective view of a personal computer having a mechanism for detachably holding a battery pack.

FIG. 1 is a perspective view of a lap top type portable personal computer. The reference numeral 1 in the figure denotes a case which is made of synthetic resin. The case 1 has a shape of a flat box, and is divided into a front portion 3 and a rear portion 5. The front portion 3 is thinner than the rear portion 5. The case 1 has inside it various electronic parts, which are not shown in the drawings, and, on an upper surface of the front portion 3, a key board 9 where a plurality of keys 7 are arranged.

The case 1 has a depressed portion 11 at a centrally front region of the rear portion 5. The depressed portion 11 receives a socket 13 which detachably holds a flat display 15 and freely swings to and fro.

Figure 2:
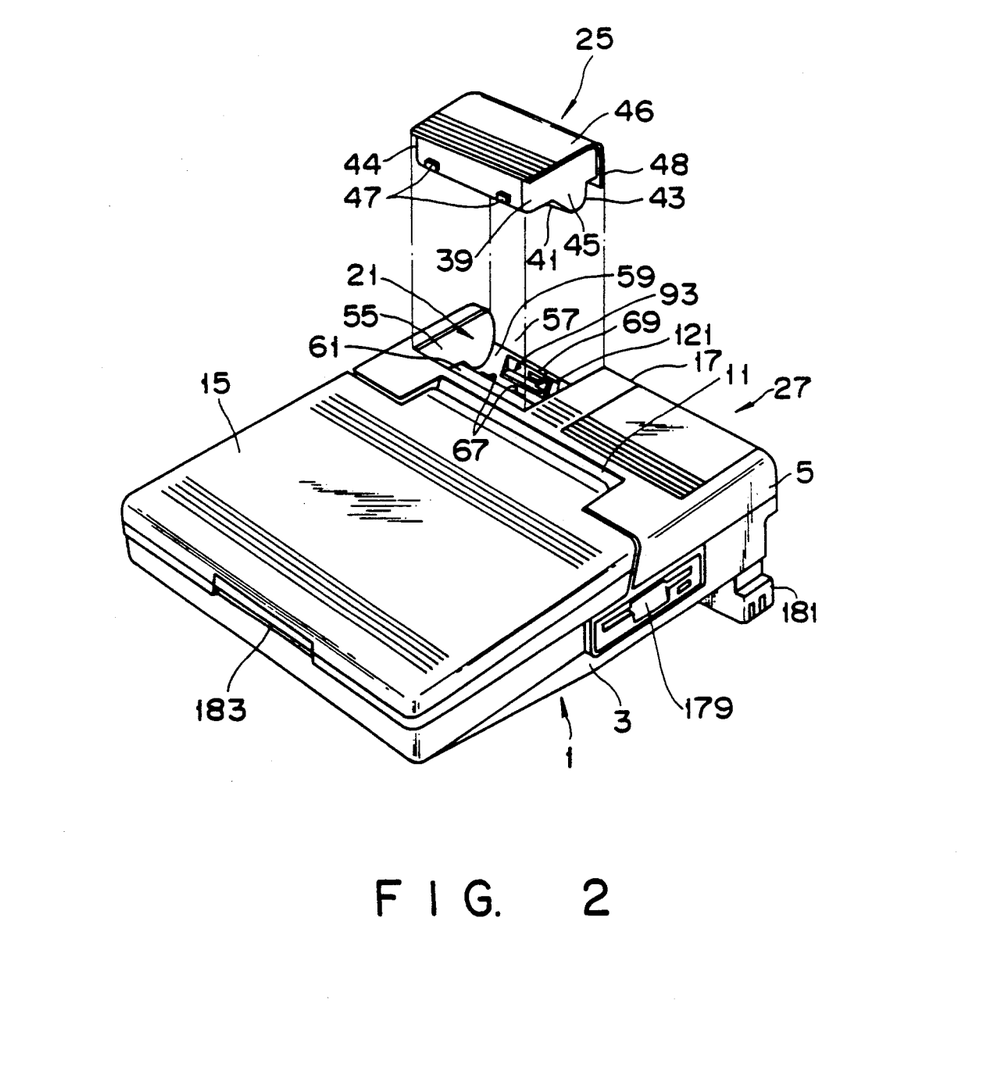
FIG. 2 is an exploded perspective view showing a state where one of the battery packs is removed from the case of the personal computer shown in FIG. 1.
Figure 4:
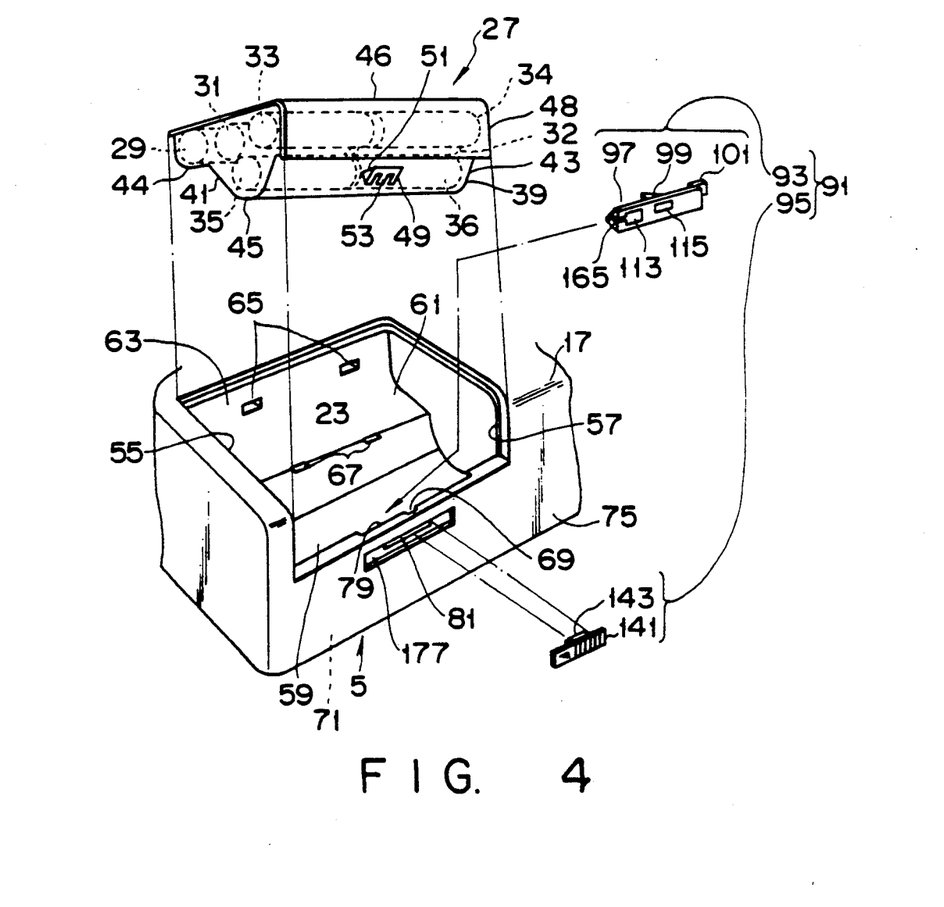
FIG. 4 is an exploded perspective view of a structure for locking and unlocking the battery pack shown in FIG. 2.

The case 1 has two recesses 21 and 23 at the upper surface of the back part of the rear portion 5, one being arranged at the left side and the other at the right side, as shown in FIGS. 2 and 4. The recesses 21 and 23 receive detachable battery packs 25 and 27 (which correspond to part units), respectively.

The structure for receiving the battery pack 25 is the same as that for receiving the battery pack 27. Therefore, only one of them will be explained below.

The battery pack 27 contains eight rechargable batteries 29 through 36, as shown in FIG. 4. Six of the rechargable batteries 29 through 34 are horizontally arranged to form three horizontal parallel rows, each made of two batteries serially connected. The remaining two batteries 35 and 36 are serially connected with each other to form another row, which is horizontally arranged below the three horizontal parallel rows and is located between the middle row and the rear row. The battery pack 27 has a casing 39 which covers all of the battery rows. The casing 39 has a front portion having a flat box shape 44 and a rear portion having at its lower surface a projection 45 which projects downwards and has two sloping surfaces 41 and 43. Note that among walls of the casing 39, an upper wall 46 and a rear wall 48 overhang the remaining walls.

The casing 39 has two bosses 47 at the front surface of the box shaped portion 44, one being arranged at its right side and the other at its left side, as shown in FIG. 2.

The casing 39 has a projection 49, which projects rearwardly, at the central part of the sloping surface 43, as shown in FIG. 4. The projection 49 has an upper flat surface 51 and a lower sloping surface 53 which is below the upper flat surface 51 and slopes downwards as it gets nearer to the sloping surface 43.

The casing 39 has, at its front sloping surface 41, two contacts (not shown in the drawings), one for a positive charge and the other for a negative charge, which electrically connected to the batteries 29 through 36.

The recess 23 is located at the back part of the rear portion 5 that includes an edge 17, and has a first opening 55 formed at the upper surface of the rear portion 5 and a second opening 57 formed at the back surface of the rear portion 5. The contour of the first opening 55 corresponds to that of the upper wall of the battery pack 27, and the contour of the second opening 57 corresponds to that of the rear wall of the battery pack 27.

The recess 23 has a rear bottom portion 59, which corresponds with the projection 4 of the battery pack 27 in cross section, and a front bottom portion 61, which corresponds to the box shaped portion 44 of the battery pack 27 in cross section. The recess 23 has at its front, side wall 63, which is connected with the front bottom portion 61, and apertures 65 which correspond with the bosses 47 on the battery pack 27.

Owing to the above structure, the battery pack 27 is securely received by the recess 23 such that the bosses 47 fit into the apertures 65 and the outer surfaces of the battery pack 27 are flush with the outer surfaces of the rear portion 5, only the battery pack 27 is obliquely inserted into the recess 23 to abut against the front side wall 63. That is to say, parts of the casing 39 function as parts of the rear portion 5 when the battery pack 27 is received by the recess 23.

The recess 23 has, at those positions of the rear bottom portion 5 that correspond with the positions of the contacts of the battery pack 27 when the battery pack 27 is inserted into the recess 23, two contacts 67 which are electrically connected with the electronic devices incorporated in the case 1 and electrically connect with the contacts of the battery pack 27 when the battery pack 27 is received by the recess 23, as shown in FIG. 4. Therefore, upon the insertion of the battery pack 27 into the recess 23, electric power is supplied to the electronic devices incorporated in the case 1.

Figure 6:
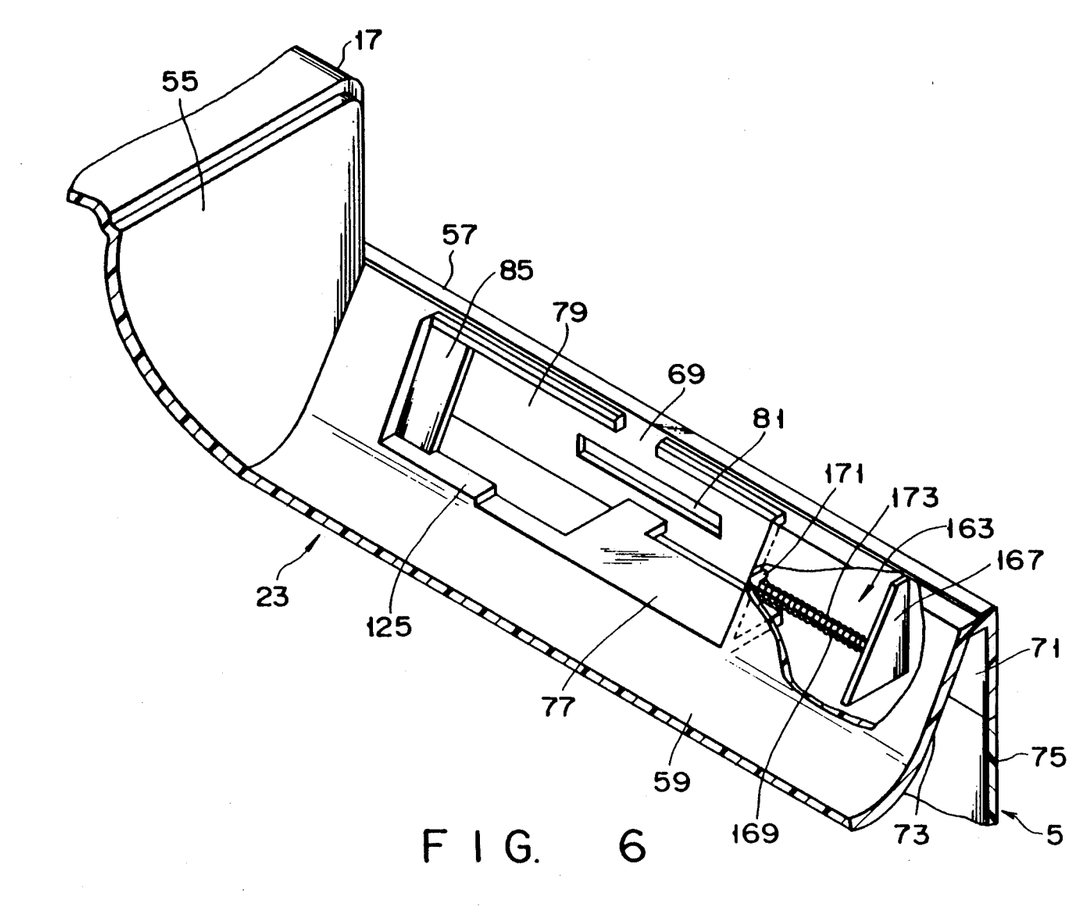
FIG. 6 is a perspective view of the passageway into which the knob unit shown in FIG. 5 is inserted.

As shown for example in FIG. 6, the case 1 has at the back of the recess 23 a passageway 71 which extends widthwise to the case 1. The passageway 71 is defined by a sloping wall 73 of the rear bottom portion 59, on which the sloping surface 43 of the battery pack 27 is supported when the battery pack 27 is inserted into the recess 23, and the back wall 75 of the rear portion 5 which is located adjacent and opposite to the back wall 75. The passageway 71 has at the lower central portion of the space defined by the walls 73 and 75 a plate 77 which connects the wall 73 with the wall 75. The passageway 71 is the space which is defined by the wall 73, the wall 75 and the plate 77, and, in cross-section, is triangularly shaped.

The wall 73 of recess 23 forming the passageway 71 has at its central portion a first opening 79 which extends widthwise to the case 1. The first opening 79 has a rectangular shape and its width extends between the upper portion of the wall 73 and the plate 77. The recess 23 and the passageway 71 are in communication with each other through the first opening 79.

The wall 73 has at the left border of the first opening 79 a thin portion 85 which is thinner than the rest of the wall 73. The first opening 79 has at the center of its upper border a channel 69 which allows insertion and removal of the projection 49 of the battery pack 27 when the battery pack 27 is inserted into and drawn out of the recess 23. The wall 75 has at that portion that faces the first opening 79 a second opening 81 which extends widthwise to the case 1. The second opening 81 has a shape of a long and slender rectangle. The passageway 71 is in communication with the external atmosphere through the second opening 81.

The passageway 71 is provided with a knob unit 91. The knob unit 91 has a slider 93 which is inserted through the first opening 79 into the passageway 71, as shown in FIG. 4, and a knob 95 which passes through the second opening 81 and is combined with the slider 93.

Figure 5:
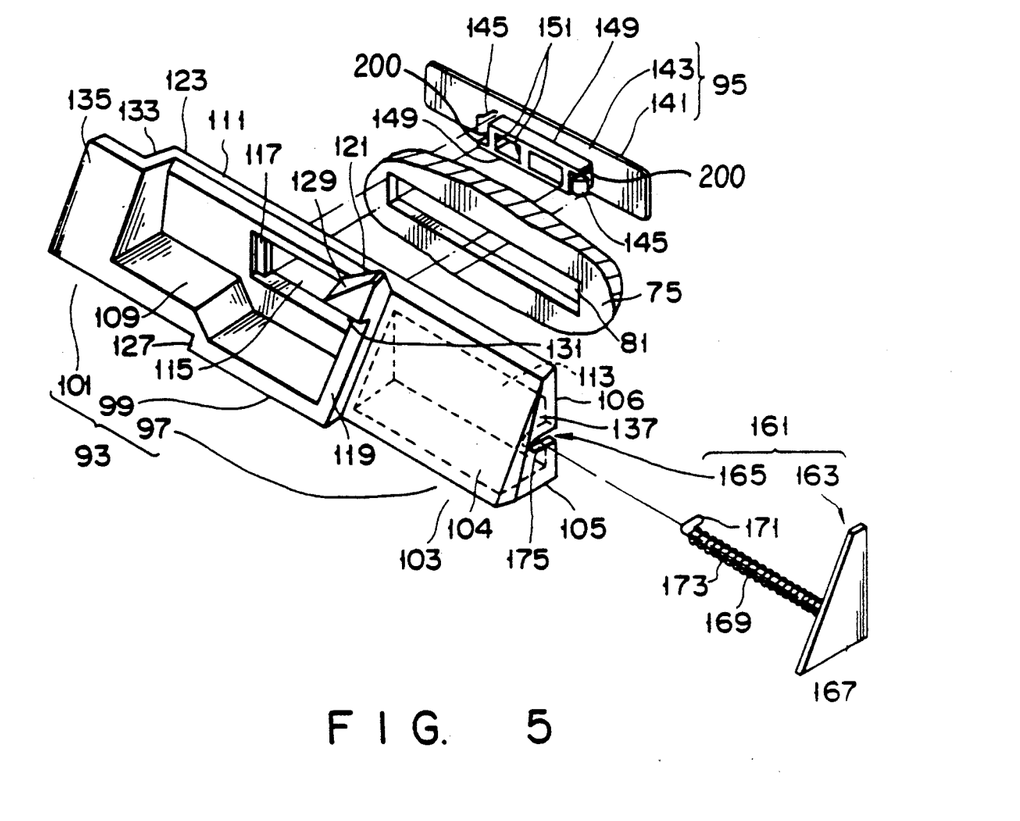
FIG. 5 is an exploded perspective view of the knob unit having the structure shown in FIG. 4.

The slider 93 has a first guide 97, a lock 99, and a second guide 101, these elements being serially arranged with one another as shown in FIG. 5.

The first guide 97 has a hollow shaft 103 shaped like a triangular prism and is fit into the passageway 71. Each of the three surfaces of the hollow shaft 103 is rectangular with its long sides extending along the length of the slider 93 and its short sides extending perpendicular to the length of the slider 93. Among the three surfaces 104 through 06, the vertical surface 106 has an aperture 113 which leads to the inner side of the shaft 103, as shown in FIG. 5.

Figure 8:
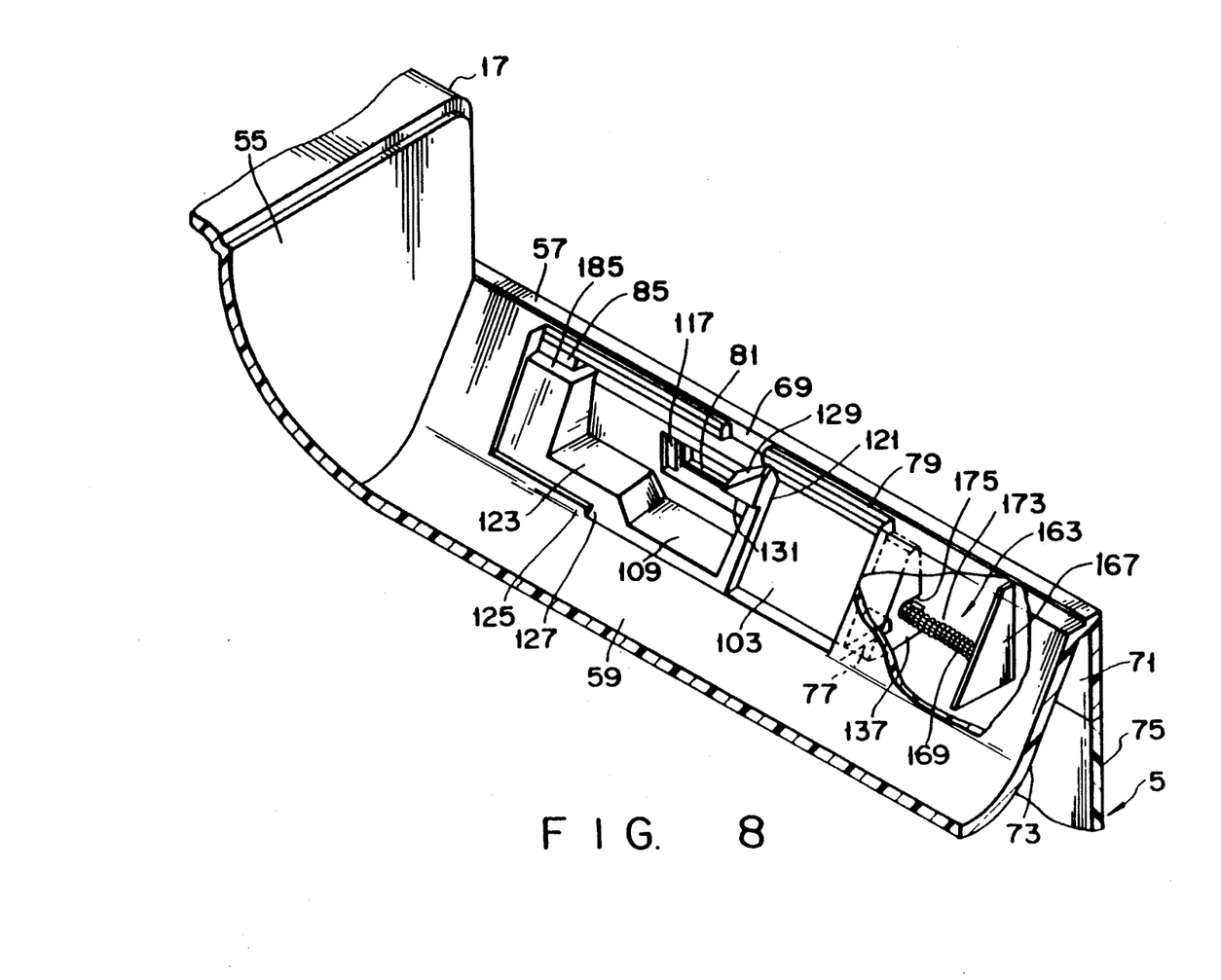
FIG. 8 is a perspective view showing a condition in which the slider is inserted into the passageway shown in FIG. 6.
Figure 9:
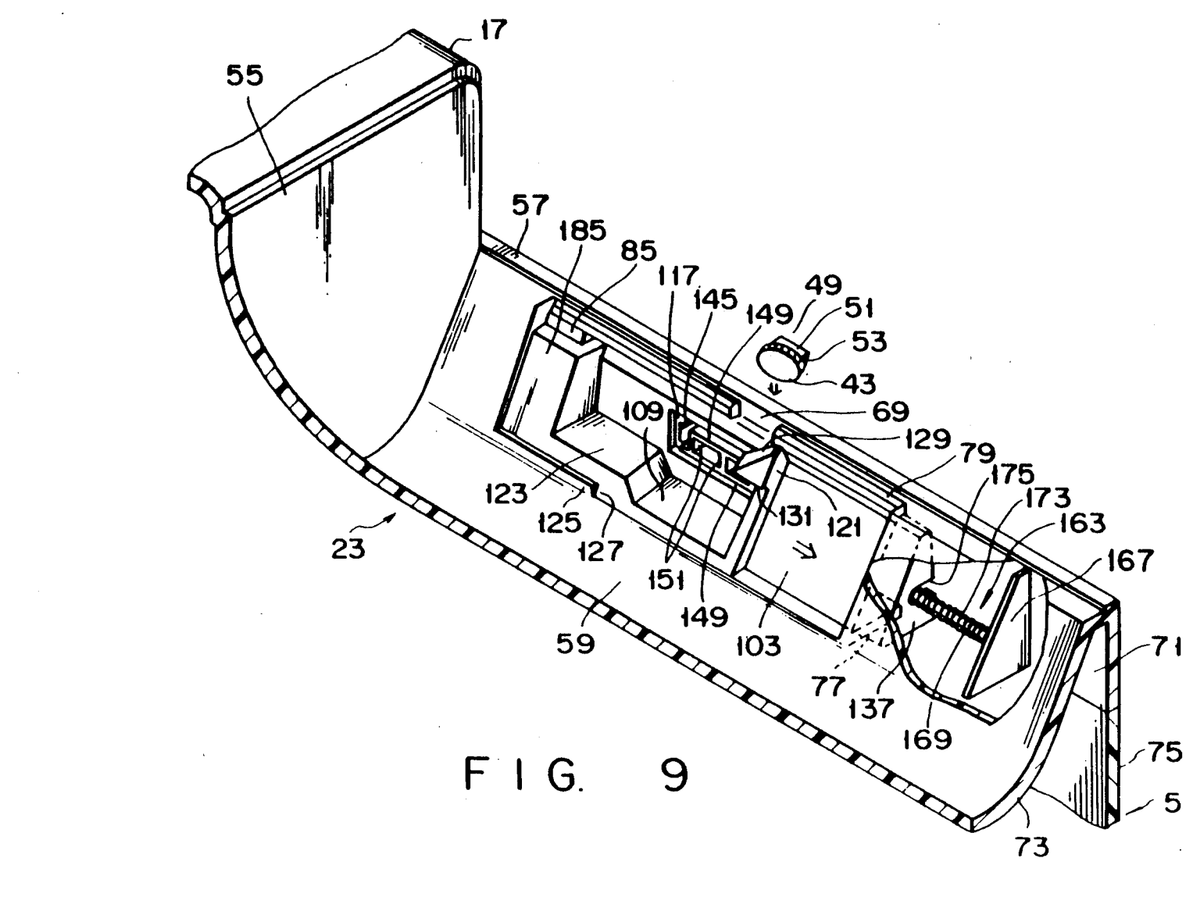
FIG. 9 is a perspective view showing a condition in which the knob is externally applied to the case and is coupled with the slider shown in FIG. 8.
Figure 10:
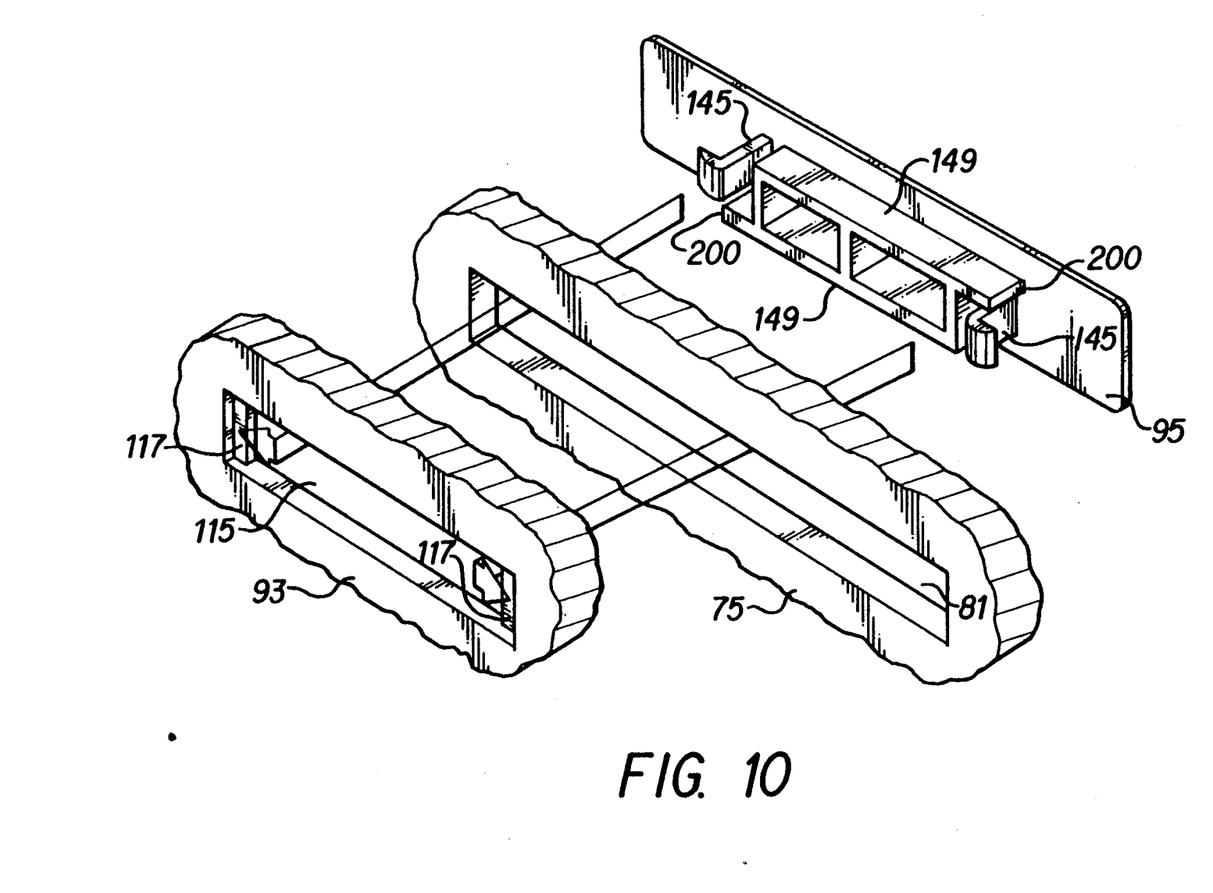
FIG. 10 is an exploded perspective view, depicting structure for connecting a knob and slider shown in FIG. 5.
Figures 11A, 11B:
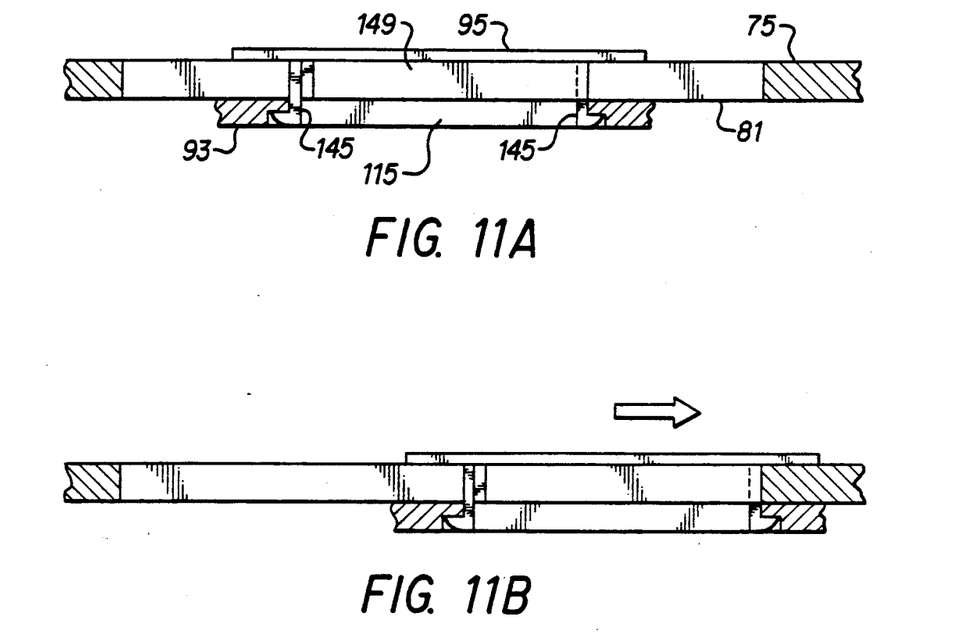
Figure 11C:
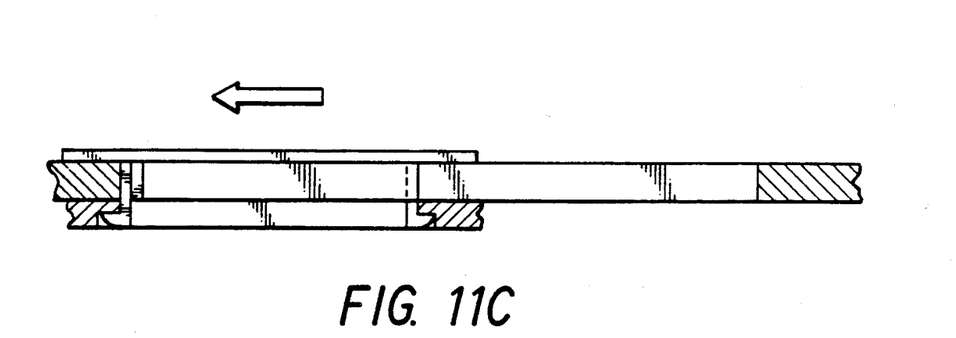
Figure 12:
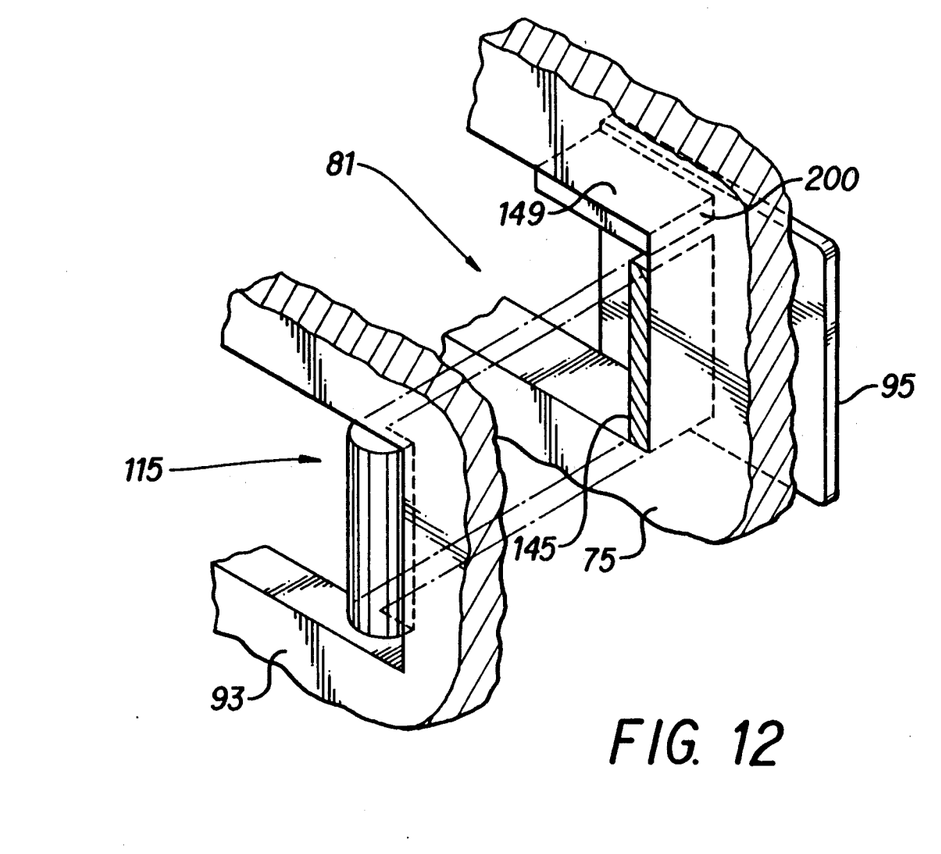
FIG. 12 is an exploded perspective view depicting in detail an interaction of a slider and one side hook shown in FIG. 5.
Figure 13:
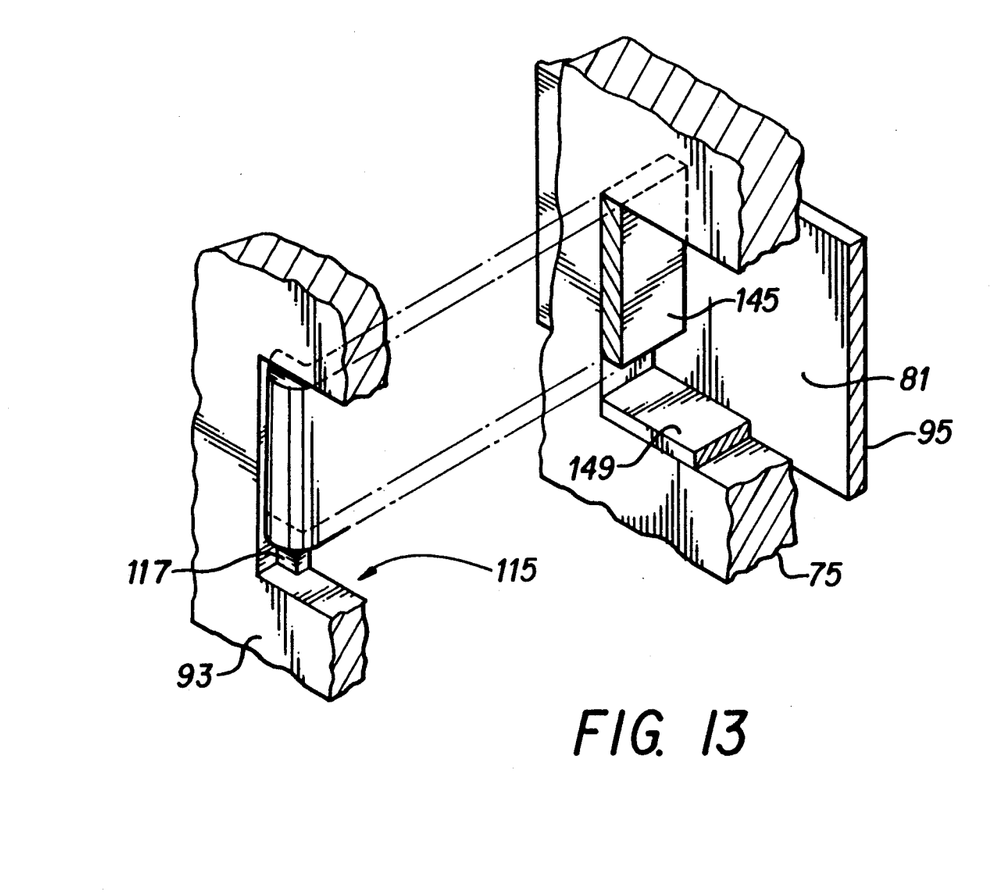
FIG. 13 is an exploded perspective view depicting in detail an interaction of a slider and another side hook shown in FIG. 5.

The first guide 97 slidably fit into the right portion of the passageway that is adjacent to the first opening 79, as shown in FIGS. 8 and 9.

The lock 99 has an element 123 which has an L-shaped cross section. The element 123 consists of a horizontal wall portion and a vertical wall portion. The horizontal wall portion includes a horizontal surface 105 which forms the lower surface of the shaft 103 and a strip shaped plate 109 which is horizontally arranged to be flush with the horizontal surface 105. The vertical wall portion includes a vertical surface 106 of the shaft 103 and a strip shaped plate 111 which is vertically arranged to be flush with vertical surface 106. The plate 109 is larger than the horizontal surface 105 in the widthwise direction, so that it widthwise projects widthwise from the horizontal surface 105 with one of its sides being flush with that of the horizontal surface 105.

The element 123 is shorter than the first opening 79, and fits into the first opening 79. Therefore, the slider 93 can slide in the passageway 71 at a distance obtained by the difference between the length of the first opening 79 and the length of the element 123.

The plate 111 has a long and slender aperture 115 at a position facing the second opening 81. The aperture 115 has a rectangular shape whose entire length is shorter than the second opening 81. The plate 111 has at each end of the longitudinal direction of the aperture 115 a thin portion 117 which is thinner than the rest of the plate 111. The two portions 117 each function as a stopper.

The plate 111 has a stepped portion 127 which engages with a stopper 125 formed on the left side of the upper surface of the plate 77. The stepped portion 127 is arranged at such a position that it abuts against the stopper 125 when the slider 93 is moved to the left a predetermined distance. Namely, the slider 93 is restricted at its left sliding direction by the stepped portion 127.

The slanted surface 104 has a band-shaped projection 119 at its edge which forms a boundary between the first guide 97 and the lock 99. The projection 119 extends over the entire edge of the slanted surface 104 from the overhanging edge of the plate 109. The projection 119 abuts against the edge of the first opening 79 to restrict the sliding movement of the slider 93 when the slider 93 is made to slide.

The projection 119 has a hook portion 121 at its upper front surface. The hook portion 121 projects out of the front surface of the projection 119. The hook portion 121 has a slanted surface 129 which descends and becomes wide as its left side and a flat surface 131 which horizontally extends at its bottom. The hook portion 121 is arranged at such a position that the slanted surface 129 faces the channel 69 of the passageway 71 when the slider 93 is completely moved to the left.

The second guide 101 has an edge wall 133 which is formed at the edge of the element 123 and a wall portion 135 which is formed at the left end of the edge wall 133 and extends in the left direction. The wall portion 135 is slidably placed on the thin portion 85 at the left border of the first opening 79. The projecting length of the wall portion 135 is made to correspond to the widthwise length of the thin portion 85.

Due to the above structure, the slider 93 slides in the passageway 71 using the hollow shaft 103 and the wall portion 135 as guides.

The slider 93 is designed such that the distance from the edge of the first guide 101 to the edge wall 133 is longer than the lengthwise distance of the first opening 79. Therefore, the slider 93 can slide without getting out of the passageway 71.

The knob 95 comprises, as shown in FIG. 5, a rectangular plate 141 which is larger than and completely covers the second opening 81 and an engaging portion 143 formed at the center of the back side of the plate 141.

The engaging portion 143 has two hooks 145 which pass through and project out of the second opening 81. The width of each of the hooks 145 is smaller than the width of the second opening 81. The hooks 145 are arranged such that they are spaced from one another in the widthwise direction of the second opening 81.

The hooks 145 project out of the plate 141 at a distance that is obtained by adding the thickness of the back wall 75 of the rear portion 5 and the thickness of the thin portion 85. The points of the hooks 145 detachably engage the respective corresponding borders of the long and slender aperture 115 of the slider 93. Due to such a structure, the slider 93 is coupled with the knob 95 arranged on the outer surface of the back wall 75, and the knob unit 91 is slidably arranged on the inside of the passageway 71.

The plate 141 has at its back surface a pair of horizontally extending limbs 149 which are located between the hooks 145. The horizontally extending limbs 149 are arranged parallel with and apart from each other by a distance corresponding to the width of the second opening 81. One of the limbs 149 is arranged such that its one end extends over and is parallel to the upper surface of the corresponding one of the hooks 145 while its other end is aligned with the lower surface of the hook. The other limb 149 is arranged such that its one end extends below and is parallel to the lower surface of the other hook 145 while its other end is aligned with the upper surface of the other hook 145. The projecting length of each of the horizontally extending limbs 149 is made to be the same as the distance that is obtained by adding the thickness of the back wall 75 to the rear portion 5 and to the thickness of the thin portion 85, in the same way as the hook 145. Namely, the horizontally extending limbs 149 pass through both the second opening 81 and the aperture 115, while they respectively touch each of the upper and lower boundaries of the opening 81 and the aperture 115, when the knob 95 is coupled with the slider 93.

Due to the above structure, each of the horizontally extending limbs 149 receives an external force acting upon each of the hooks 145 and reduces the burden put upon it. The extensions of the limbs 149 which absorb the force of the motion to avoid damage to the hooks 145 are also called stoppers 200. The numeral 151 denotes vertical limbs for linking the horizontally extending limbs 149.

The passageway 71 has an urging means 161 for urging the slider 93 towards the left side of its sliding direction. The urging means 161 comprises an urging unit 163, which is provided at the right edge of the passageway 71 as shown in FIG. 6, and a receiving portion 165, which is shown in FIG. 5.

The urging unit 163 comprises, as shown in FIG. 5, a triangle base plate 167 which corresponds to the sectional shape of the passageway 71, a rod 169 which is provided at the base plate 167 and projects out of one of the surfaces of the base plate 167, a bent portion 171 which is formed at the projecting end of the rod 169 and is bent perpendicular to the axial direction of the rod 169, and a compressed coil spring 173 which covers the entire length between the bent portion 171 and the base plate 167 and has a smaller winding diameter than the length of the bent portion 171.

The coil spring 173 rarely separates from the rod 169, even if no load (a force acting to compress the spring) is applied to it once it is arranged on the urging unit 163, since it is suspended between the bent portion 171 and the base plate 167.

The base plate 167 of the urging unit 1 3 is fixed to the right edge of the passageway 71 such that the coil spring 173 and the rod 169 extend through the passageway 71, as shown in FIG. 6.

The receiving portion 165 is formed of a slit 175 which is located at the right side of an end wall 137 of the slider 93 and allows the passage of the rod 169 alone. Due to such a structure, the coil spring 173 abuts against the end wall 137 of the slider 93, so that the whole of the slider 93 is always urged towards the left side by the elasticity of the coil spring 173.

The urging means 161 having the above structure functions as follows.

When the battery pack 27 is inserted into the recess 23, the projection 49 passes through the channel 69 and reaches the hook portion 121. Then, the lower sloping surface 53 of the projection 49 abuts against the slanted surface 129 of the hook portion 121, which slides the slider 93 towards the urging unit 163. After the projection 49 has passed through the slanted surface 129, the slider 93 slides back to its original position due to the elasticity of the coil spring 173. When the slider 93 takes its original position, the hook portion 121 is located just above the projection 49 and restrains the vertical movement of the battery pack 27. Thus, the hook portion 121 firmly locks the battery pack 27 within the recess 23 with the help of the fit engagement of the bosses 47 the apertures 65. Therefore, the battery pack 27 is prevented from coming out of the recess 23.

When the knob 95 is moved towards the urging unit 163 of the urging means 161, the lock is released and the battery pack 27 can be taken out of the recess 23.

The back wall 75 has a recessed area 177 at that position of its outer surface that corresponds to the movable region of the plate 141, such that the plate 141 is flush with the outer surface of the back wall 75 except the recessed area 177.

In FIG. 1, the numeral 179 denotes a slit for inserting a floppy disk, the numeral 181 a leg for tilting the case 1, and the numeral 183 a latch.

Figure 7:
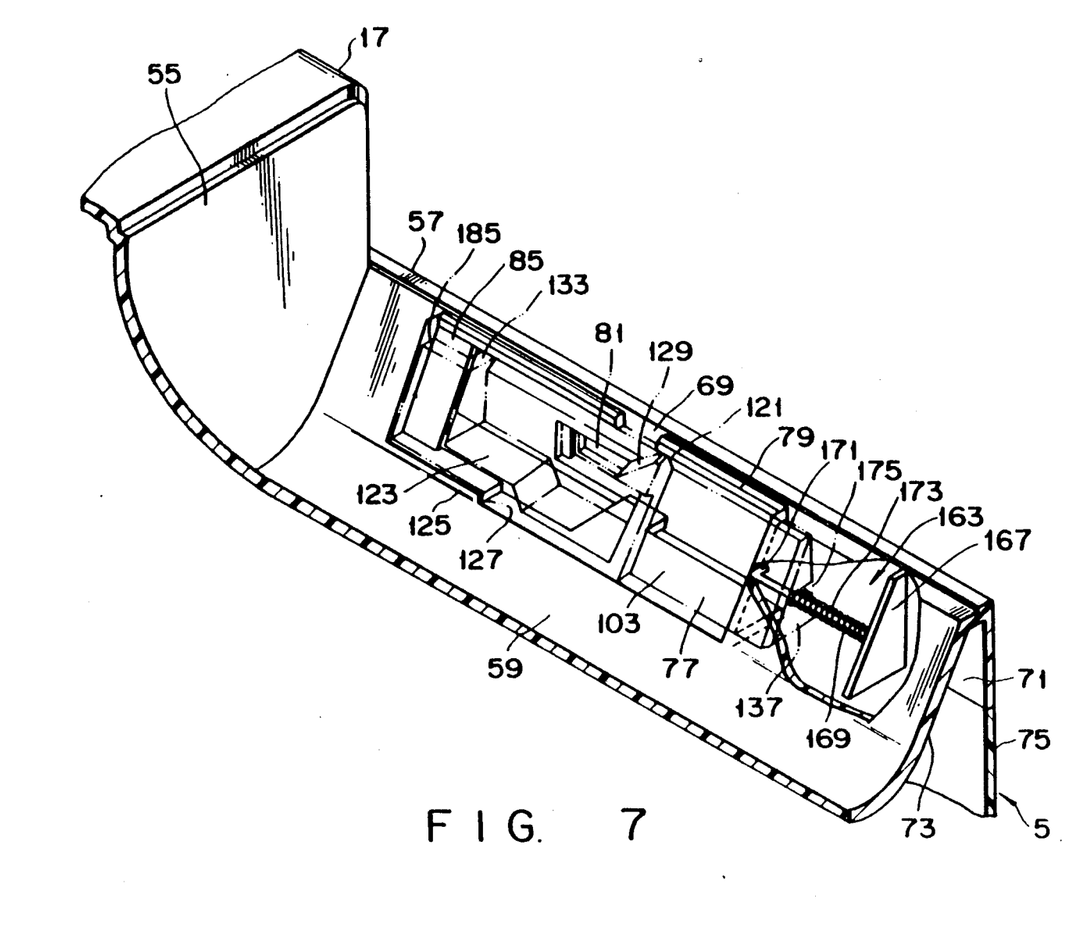
FIG. 7 is a perspective view showing a positional relationship between the passageway shown in FIG. 6 and the slider which is to be inserted into the passageway.

The slider 93 is incorporated into the case 1 as follows: First, the urging unit 163 is placed inside of the passageway 71, as shown in FIG. 6. Second, the slider 93 is oriented such that its end having the slit 175 faces the passageway 71, and is inserted from the recess 23 through the first opening 79 to the passageway 71 where the urging unit 163 is placed. As the slider 93 is inserted into the passageway 71, the point of the rod 169 is received by the slit 175. The slider 93 is completely pushed into the passageway 71, and the whole of the slider 93 is fit in the passageway 71, as shown in FIG. 7, where a two-dots and a dashed line indicates the fit condition, and FIG. 8.

At this moment, the aperture 115 is brought into registry with the second opening 81 due to the slider 93 being urged by the coil spring 173.

After the attachment of the slider 93, the knob 95 is externally arranged on the outer surface of the back wall 75 to cover the second opening 81, and the hooks 145 are inserted into the second opening 81. Then, as shown in FIG. 9, the point of each of the hooks 145 is engaged with the corresponding one of the side borders of the aperture 115.

Due to the above engagement, the slider 93 is coupled with the knob 95, and the attachment of the knob unit 91 is finished.

The slider 93 can be easily fit into the passageway 71 since the knob 95 is externally incorporated to the slider 93 after the slider 93 is placed in the passageway 71, as explained above. Namely, the fitting operation of the slider 93 is not hindered by the knob 95. In addition, the knob 95 functions as a part for preventing the slider 93 from getting out of the passageway 71, since the knob 95 is larger than the second opening 81. Therefore, the knob unit 91 is surely prevented from getting out of the first opening 79.

Figure 3:
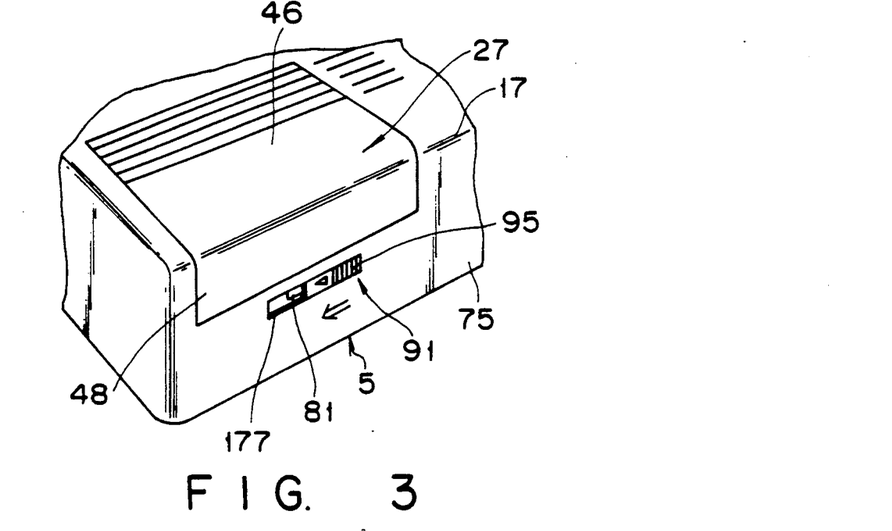
FIG. 3 is a partial perspective view showing a state where the battery pack shown in FIG. 2 is incorporated in the case.

After the attachment of the slider 93 has been finished, the bosses 47 are respectively inserted into the apertures 65, and the battery pack 27 is inserted into the recess 23. Then, as shown in FIG. 3, the projection 49 of the battery pack 27 engages with the hook portion 121 of the slider 93, and the battery pack 27 is firmly locked into the case 1.

Note that the present invention is also applicable to a case where a part unit such as a hard disk drive device (HDD) is incorporated into the case 1.

Furthermore, the present invention is also applicable to any portable electronic devices in addition to personal computers. For instance, it is applicable to portable word processors.

The present invention is applicable to not only a recess open to both the upper and rear portions of the case, but also a recess open to either one of them, or a recess open to the lower surface of the case.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. An electronic device comprising:
    a case having an edge, a first wall intersecting the edge, and a recess close to the edge having a second wall facing the first wall;
    a passageway defined by the first wall of said case, and the second wall of said recess, opposing the first wall, said passageway elongated along said edge and having an end;
    a first opening in said second wall, which is shorter than a length of said passageway, and elongated in a longitudinal direction of said passageway, said first opening being in communication with the recess;
    a second opening in said first wall, defined by a pair of first edges formed in said first wall, and a pair of second edges connected with these first edges, having a length shorter than said first edges elongated in a direction intersecting a length direction of said passageway, said second opening being in communication exterior of the case;
    a slider slidably set in said passageway from said first opening, having a third opening opposing said second opening, said third opening being longer than said first opening, said third opening having a narrow dimension defined by a pair of third edges having a length shorter than the first opening in said second wall elongated in the direction of the length of said passageway, said third opening having a pair of fourth edges, connected to the third edges, having a length the same as the second edges elongated in the direction intersecting the longitudinal direction of the passageway;
    a knob provided on the outside of the first wall of said case covering said second opening, said knob having a size larger than the second opening;
    a pair of first hooks projecting from said knob, corresponding to the pair of the fourth edges of said third opening, said first hooks having tip portions extending through said second opening and engageable with the fourth edges of said third opening and a side surface opposing the first edge of said second opening, and being slidable back and forth between said knob and said slider within a range defined by the pair of the second edges of said second opening;
    a pair of stoppers formed on said knob, one running in parallel with a side surface of one of said pair of first hooks, and another running in parallel with a side surface of another of said pair of first hooks, said stoppers extending through said second opening, and abutting the pair of second edges of said second opening when said slider slides until stopped by said pair of first hooks and the pair of said second edges of said second opening;
    a second hook formed on said slider such that it projects from said first opening into said recess, which is placed at a lock position when said slider slides to one side of said passageway, and at a unlock position when said slider slides to an opposite side;
    urging means provided on an end of said passageway urging said slider to the lock position; and
    a part unit in the recess, having a projection at a position corresponding to that of said second hook at the lock position, affixing said part unit by engaging with said second hook when said slider slides to the lock position side and releasing the engagement when said slider slides to the unlock position side.

2. The electronic device according to claim 1, wherein said part unit comprises a battery pack in which a plurality of cylindrical batteries placed in series are arranged horizontally in three rows in parallel with each other, and a plurality of cylindrical batteries placed in series are arranged at depressed portions of a lower side of the three rows, formed between a center row and one of the two other rows, said three rows of the batteries arranged in parallel being packed as in a parallelpiped-shaped box, and the other batteries being packed as in a triangular-prism-like casing having a sloping surface with a projection.

3. An electronic device comprising:
    a case having an edge, a first wall intersecting the edge, and a recess close to the edge having a second wall facing the first wall;
    a passageway defined by the first wall of said case, and the second wall of said recess, opposing the first wall, said passageway elongated along said edge and having an end;
    a first opening in said second wall, which is shorter than a length of said passageway, and elongated in a longitudinal direction of said passageway, said first opening being in communication with the recess;
    a second opening in said first wall, defined by a pair of first edges formed in said first wall, and a pair of second edges connected with these first edges, having a length shorter than said first edges elongated in a direction intersecting a length direction of said passageway, said second opening being in communication exterior of the case;
    a slider slidably set in said passageway from said first opening, having an end and a third opening at a place opposing an opening of said second opening, said third opening being longer than said first opening, said third opening having a narrow dimension, defined by a pair of third edges having a length shorter than the first opening in said second wall elongated in the direction of the length of said passageway, said third opening having a pair of fourth edges, connected with the third edges, having a length the same as that of the second edges elongated in the direction intersecting the longitudinal direction of the passageway;
    a knob provided on the first wall of said case such that the knob said second opening from an outside of the case, said knob having a size larger than said second opening;

a pair of first hooks projecting from said knob, corresponding to the pair of the fourth edges of said third opening, said first hooks having tip portions extending through said second opening and engageable with the fourth edges of said third opening and a side surface opposing the first edge of said second opening, and being slidable back and forth between said knob and said slider within a range defined by the pair of the second edges of said second opening;

a pair of stoppers projecting from said knob, one running in parallel with a side surface of one of said pair of first hooks, and another running in parallel with a side surface of another of said pair of first hooks, said stoppers extending through said second opening, and abutting the pair of second edges of said second opening when said slider slides until stopped by said pair of first hooks and the pair of said second edges of said second opening;

a second hook projecting from said slider such that it projects form said first opening into said recess, said second hook being placed at a lock position when said slider slides to one side of said passageway, and at a unlock position when said slider slides to an opposite side;

an urging unit provided at the end of said passageway, including a basic body, a rod elongated towards the end portion of said slider from a surface of said basic body, a bent portion formed at the end of the rod elongated and bent in a direction perpendicular to an axial direction of the rod, and a coil spring having a smaller diameter than a length of the bent portion, coiled between the bent portion of the rod and an end portion of said basic body in a compressed state;

a receiving portion provided at an end of said slider in a position corresponding to that of said rod, said receiving portion including a groove portion into which said coil spring is compressed upon insertion of said rod in the passageway when said slider is fit into said passageway, said slider being urged to the lock position side by the coil spring; and a part unit in the recess, having a projection at a position corresponding to that of said second hook at the lock position, fixing said part unit by engaging with said second hook when said slider slides to the lock position side and releasing the engagement when said slider slides to the unlock position side.

4. The electronic device according to claim 3, wherein said part unit comprises a battery pack in which a plurality of cylindrical batteries placed in series are arranged horizontally in three rows in parallel with each other, and a plurality of cylindrical batteries placed in series are arranged at depressed portions of a lower side of the three rows, formed between a center row and one of the two other rows, said three rows of the batteries arranged in parallel being packed as in a parallelepiped-shaped box, and the other batteries being packed as in a triangular-prism-like casing having a sloping surface with a projection.

5. The electronic device according to claim 1, wherein said pair of stoppers are arranged such that they are located on different sides of the first hooks from each other, and each of the stoppers is elongated along each of the pair of the first edges of said second opening.

6. The electronic device according to claim 3, wherein said pair of stoppers are spaced from each other on different sides of the pair of first hooks, and each of the stoppers is elongated along each of the pair of the first edges of said second opening.

* * * * *

UNITED STATES PATENT AND TRADEMARK OFFICE
CERTIFICATE OF CORRECTION

PATENT NO.   :   5,130,892
DATED        :   July 14, 1992
INVENTOR(S)  :   Youji Satou It is certified that error appears in the above-identified patent and that said Letters Patent is hereby corrected as shown below:

Claim 1, column 10, line 10, change "a" to --an--.

Claim 2, column 10, line 31, change "parallelpiped-shaped" to --parallelepiped-shaped--.

Claim 3, column 10, line 68, after "knob" insert --covers--.

Claim 3, column 11, line 23, change "form" to --from--.

Claim 3, column 11, line 26, change "a" to --an--.

Signed and Sealed this

Twenty-third Day of November, 1993

Attest:

BRUCE LEHMAN

*Attesting Officer*     *Commissioner of Patents and Trademarks*